Nov. 20, 1934.                S. ALSOP                1,981,215
                               MIXER
                     Original Filed July 10, 1929
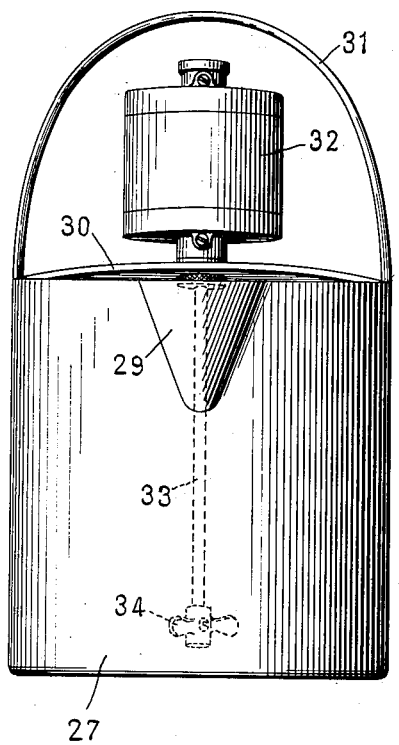
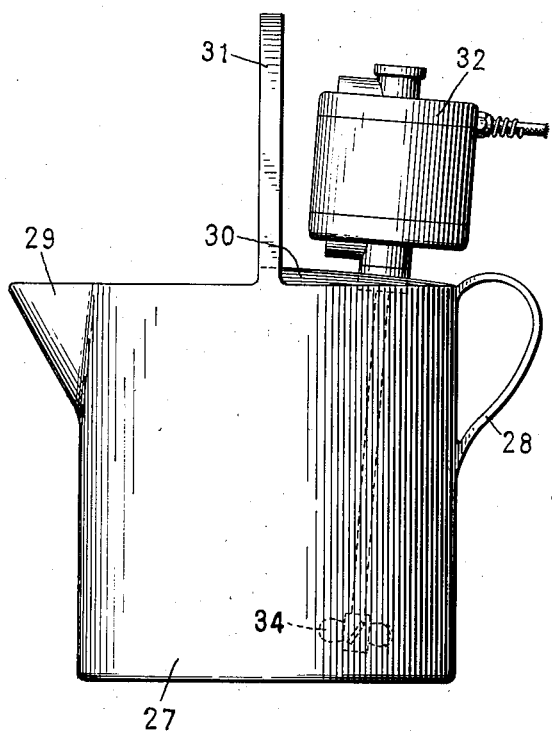
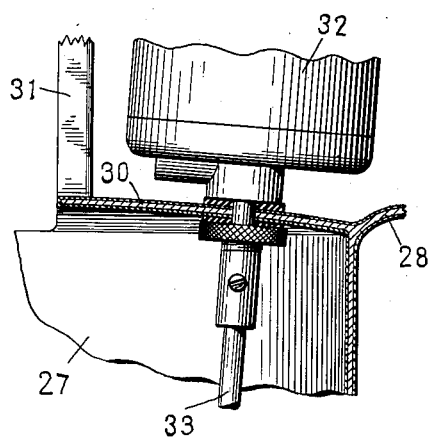
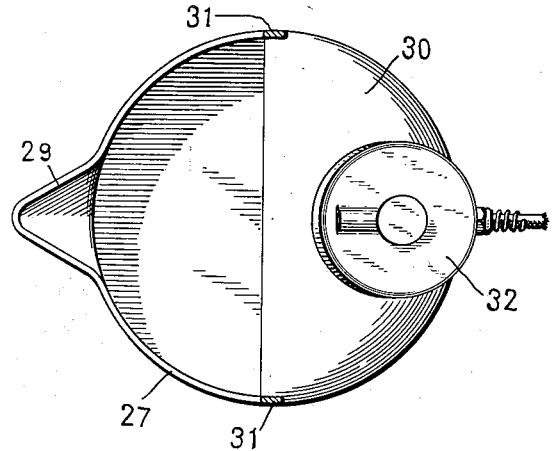
INVENTOR
Samuel Alsop,
BY
ATTORNEY Patented Nov. 20, 1934

1,981,215

UNITED STATES PATENT OFFICE 1,981,215

MIXER

Samuel Alsop, New York, N. Y.

Original application July 10, 1929, Serial No. 377,222. Divided and this application October 30, 1931, Serial No. 572,160

4 Claims. (Cl. 259—103)

This invention relates generally to mixers for liquids and more particularly to portable mixers driven by an electric motor. This application is a division from my application 377,222 filed July 10, 1929.

Heretofore in some mixers the motor has been secured in place by a U-shaped bracket and clamp screw on the top edge of the container, and the edge is often damaged by the clamp, due to the vibration of the motor. Again, this clamping arrangement not being very secure, the motor is likely to work loose and fall into the container and spoil the contents and damage the motor. The foregoing and other objections of the devices now in use are overcome in the present invention by providing a support which is formed integrally with the container and securing the motor directly to said support. This support is so formed that it reinforces the edge of the container and is reinforced by said edge, thereby presenting a rigid and secure support for the motor.

A primary purpose of the present invention is to provide a mixer with a rigid and secure support for a motor which is at the same time simple and economical to manufacture, light in weight and sanitary.

Another purpose is to provide a support for the motor that reinforces the edge of the container.

Other objects and advantages will appear from the description taken in connection with the annexed drawing, in which—

Fig. 1 is a side view of a mixer embodying one form of the invention.

Fig. 2 is a front view of the same.

Fig. 3 is a top plan view with the side handle broken away and the carrying handle in section.

Fig. 4 is a fragmentary sectional view showing the motor support on a larger scale.

The invention includes a reservoir or container 27 provided with a rear or pouring handle 28 and a spout 29. This reservoir is preferably made of metal, enameled with porcelain or other suitable material for holding syrup, molasses or other liquid which it is desired to mix.

Formed integrally with the body of the container at its rear edge is a covering flange or support 30. This support extends outwardly and is slightly arched upwardly extending to a point removed from the center of the container, that is, its diameter is not quite half the diameter of the container.

A carrying handle 31 reaching from side to side of the container is positioned at the outer end of the support and may be formed integrally with the container and also integral with the support 30, if desired.

The motor 32 is fixed to support 30 by the nut 32' and operatively connected to the shaft 33 which carries the mixing propeller 34. The shaft 33 it will be observed is disposed at an angle which facilitates the stirring.

This construction disposes the weight of the container and motor so that it is fairly well balanced for carrying whether full or empty.

The container and the bracket or support for the motor are preferably formed of sheet metal such as steel and coated or glazed with porcelain or the like after the parts are united so as to provide a continuous sanitary coating extending over all the joints and seams and avoid any pockets likely to collect dirt, etc.

It will be understood that various changes might be made in the details of construction without departing from the principle of my invention.

I claim:

1. The combination of a portable container, an agitator therein, a support formed integrally with said container, a motor for operating said agitator secured to said support and a handle formed integrally with said container and support, said handle and support being positioned to one side of the center of said container whereby said container and contents may be transported by said handle in a balanced position.

2. A portable mixer comprising a container, an integral flange extending inwardly and upwardly from the rear edge thereof and covering the opened end of the container at said point, a handle at the rear of said container, a curved handle extending from side to side of said container at the point adjacent the free edge of said flange, a motor supported fixedly by and above said flange, an operating shaft depending from said motor at a slight angle to the vertical and a propeller mounted on the lower end of said shaft.

3. A portable mixer comprising a container, an integral flange extending inwardly from the rear edge thereof and covering the open end of the container at said point, a handle at the rear of said container, a motor supported fixedly by and above said flange near the rear handle, a handle extending from side to side of said container in front of and spaced from the motor for lifting the container, an operating shaft depending from said motor at a slight angle to the vertical and positioned entirely on one side of the container and a propeller mounted on the lower end of said shaft, said container, flange and handles forming a single unit.

4. Mixing apparatus comprising a portable container having an arched reinforcing and supporting member integrally and permanently connected around one edge of the container and extended over approximately one half of the top of said container, an electric motor secured to said arched member adjacent the container edge and having a shaft disposed at an angle to the vertical with at least one mixing propeller positioned and rotatable entirely at one side of the container near the bottom so that stirring is facilitated and integral handles at the top and side of the container for carrying and tilting the same respectively.

SAMUEL ALSOP.